(12) United States Patent
Kodaira (10) Patent No.: US 8,358,470 B2
(45) Date of Patent: Jan. 22, 2013

(54) ZOOM LENS AND IMAGE PICKUP APPARATUS INCLUDING THE SAME

(75) Inventor: Masakazu Kodaira, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 54 days.

(21) Appl. No.: 13/115,633

(22) Filed: May 25, 2011

(65) Prior Publication Data
US 2011/0292522 A1 Dec. 1, 2011

(30) Foreign Application Priority Data
May 26, 2010 (JP) .................................. 2010-120561

(51) Int. Cl.
*G02B 15/14* (2006.01)
(52) U.S. Cl. .......................... 359/683; 359/686; 359/691
(58) Field of Classification Search .................. 359/683, 359/686, 689, 691
See application file for complete search history.

(56) References Cited

U.S. PATENT DOCUMENTS

| | | | |
|---|---|---|---|
| 4,192,577 A | 3/1980 | Ogino | |
| 4,576,445 A | 3/1986 | Inadome | |
| 6,545,818 B2 | 4/2003 | Usui et al. | |
| 2005/0207030 A1 | 9/2005 | Wakazono | |
| 2007/0109665 A1 | 5/2007 | Wakazono | |
| 2011/0122506 A1* | 5/2011 | Ito | 359/683 |

FOREIGN PATENT DOCUMENTS

| | | |
|---|---|---|
| GB | 1203506 A | 8/1970 |
| JP | 2009-122418 A | 6/2009 |

OTHER PUBLICATIONS

European Search Report issued Sep. 30, 2011 in corresponding European patent application No. 11166472.8.

* cited by examiner

*Primary Examiner* — William Choi
(74) *Attorney, Agent, or Firm* — Rossi, Kimms & McDowell LLP (57) ABSTRACT

A zoom lens, including: a front lens group; an aperture stop; and a rear lens group, in which the rear lens group includes: a front lens unit and a rear lens unit, a maximum air interval of the rear lens group being interposed between the front lens unit and the rear lens unit, in which the rear lens unit includes: a first lens which is located on the most object side; a second lens which is located on the most image side, and the following conditional expressions are satisfied: $-6.0 \leq fs1/frr \leq -1.0$; and $-9.0 \leq fs3/frr \leq -2.0$, where frr indicates a focal length of the rear lens unit, and fs1 and fs3 indicate a focal length of the first lens and a focal length of the second lens, respectively.

9 Claims, 9 Drawing Sheets

ZOOM LENS AND IMAGE PICKUP APPARATUS INCLUDING THE SAME

BACKGROUND OF THE INVENTION

1. Field of the Invention

The present invention relates to a zoom lens, which is suitable for use in a broadcasting television (TV) camera, a video camera for image pickup, and a digital still camera or the like, and to an image pickup apparatus including the zoom lens.

2. Description of the Related Art

Conventionally, there has been known, as a zoom lens for broadcasting television (TV) camera, a zoom lens in which a front lens group including a magnification-varying lens unit (magnification-varying portion) and a rear lens group including a relay lens unit (relay portion) are arranged. The front lens group is located on an object side of an aperture stop and the rear lens group is located on an image side thereof. The front lens group includes, in order from the object side to the image side, a first lens unit having a positive refractive power and including a focusing lens unit, a second lens unit having a negative refractive power for magnification-varying, and a third lens unit having a negative refractive power for correcting an image plane variation due to magnification-varying.

The rear lens group includes a fourth lens unit (relay portion) having a positive refractive power for imaging. In such a four-unit zoom lens including the four lens units in total, the relay portion includes two lens units separated from each other by a long air interval. There has been known a four-unit zoom lens in which, for example, a focal length converter (extender) for increasing a magnification (focal length) of the entire system may be inserted between the two lens units (Japanese Patent Application Laid-Open No. 2009-122418, U.S. Pat. No. 6,545,818).

In Japanese Patent Application Laid-Open No. 2009-122418, a ⅓-inch image pickup element is used. In U.S. Pat. No. 6,545,818, a ⅔-inch image pickup element is used. Japanese Patent Application Laid-Open No. 2009-122418 and U.S. Pat. No. 6,545,818 disclose a zoom lens for TV broadcasting in which the extender is removably insertable between, of the lens units included in the relay portion, lens units having a maximum air interval to shift a focal length range of the entire system.

In the zoom lens for a television camera, a color separation prism is disposed on the image side to obtain image data of R, G and B each. In a television camera main body side, the image data of R, G and B are synthesized into a single image to obtain a color image.

The zoom lens for a television camera has a long back focus to dispose the color separation prism on the image side. In order to suppress occurrence of white-shading (phenomenon that even when white balance is achieved in center of screen, upper end and lower end of screen are colored with green or magenta), an exit pupil is set as far away as possible from the image plane.

In many cases, the white-shading occurs because an incident angle of a ray entering a dichroic film of the color separation prism changes depending on a position on a screen. When the white-shading occurs, the quality of the color image significantly deteriorates over the entire screen.

In recent years, a small-size image pickup element has been used for the broadcasting TV camera because of the demand for reducing the size of the entire apparatus.

In the four-unit zoom lens described above, if the size of the screen is fitted to the small-size image pickup element, the power of the relay portion increases, and hence it is difficult to maintain the long back focus. Further, the position of the exit pupil which is a conjugate image of the aperture stop becomes closer to an image pickup element position (image plane).

As a result, it is difficult to dispose the color separation prism on the image side and the white-shading is more likely to occur. In recent years, as the zoom lens for a television camera, there has been strongly desired a zoom lens in which even when the small-size image pickup element is used, the back focus is sufficiently long and the exit pupil is set away from the image plane.

SUMMARY OF THE INVENTION

Provided is a zoom lens, comprising, in order from an object side to an image side: a front lens group including a lens unit which is moved during zooming; an aperture stop; and a rear lens group having a positive refractive power, which is not moved for zooming, in which the rear lens group includes: a front lens unit having a positive refractive power, which is located on the object side of a maximum air interval in the rear lens group; and a rear lens unit having a positive refractive power, which is located on the image side of the maximum air interval in the rear lens group, the maximum air interval in the rear lens group being interposed between the front lens unit and the rear lens unit, in which the rear lens unit includes: a first lens (s1) having a negative refractive power, which is located on the most object side; a second lens (s3) having a negative refractive power, which is located on the most image side, and in which the following conditional expressions are satisfied:

$$-6.0 \leq fs1/frr \leq -1.0; \text{ and}$$

$$-9.0 \leq fs3/frr \leq -2.0,$$

where frr indicates a focal length of the rear lens unit, and fs1 and fs3 indicate a focal length of the first lens (s1) and a focal length of the second lens (s3), respectively.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An object of the present invention is to provide a zoom lens in which a back focus is long, an exit pupil is located far away from an image plane, white-shading is less likely to occur, and a high-quality image is obtained, and an image pickup apparatus including the zoom lens.

A zoom lens according to the present invention includes, in order from an object side to an image side, a front lens group LF including lens units moved during zooming, an aperture stop SP and a rear lens group LR having a positive refractive power which is not moved for zooming.

The front lens group LF includes a first lens unit G1 having a positive refractive power, which is not moved for zooming, a second lens unit G2 having a negative refractive power, which is moved during zooming, a third lens unit G3 having a negative refractive power, which is moved during zooming.

The rear lens group LR includes a front lens unit rf having a positive refractive power, which is located on an object side of a maximum air interval, and a rear lens unit rr having a positive refractive power, which is located on an image side of the maximum air interval. The rear lens unit rr includes a lens s1 having a negative refractive power, which is located on the most object side, and a lens s3 having a negative refractive power, which is located on the most image side. The rear lens unit rr further includes a lens s2 having a positive refractive power, which is located on the object side of and adjacent to the lens s3. The lens s2 and the lens s3 may be separately provided or cemented to each other.

Figure 1:
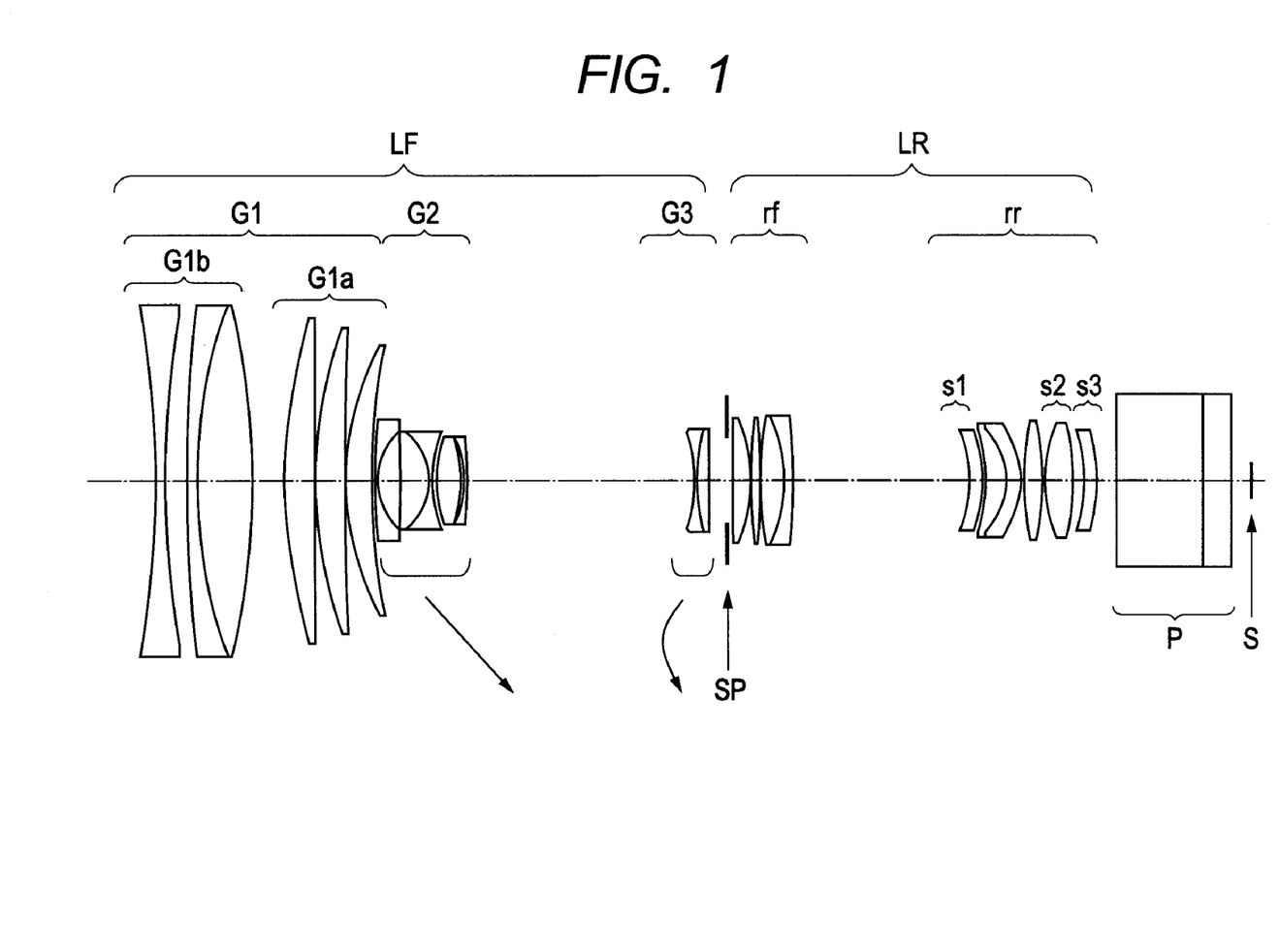
FIG. 1 is a lens cross sectional view at a wide-angle end according to Numerical Embodiment 1.
Figure 2A:
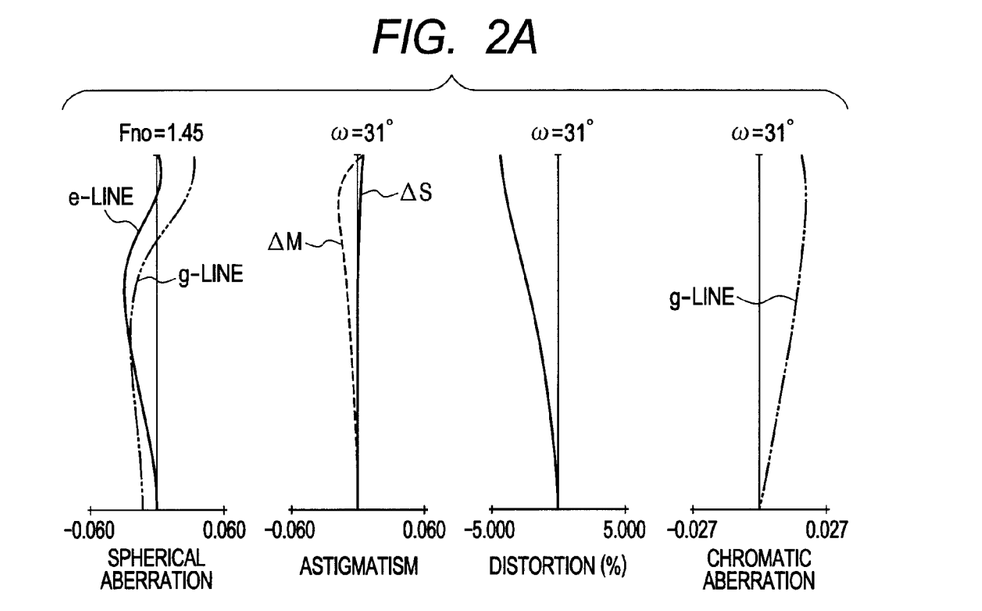
FIG. 2A is an aberration graph at the wide-angle end according to Numerical Embodiment 1.
Figure 2B:
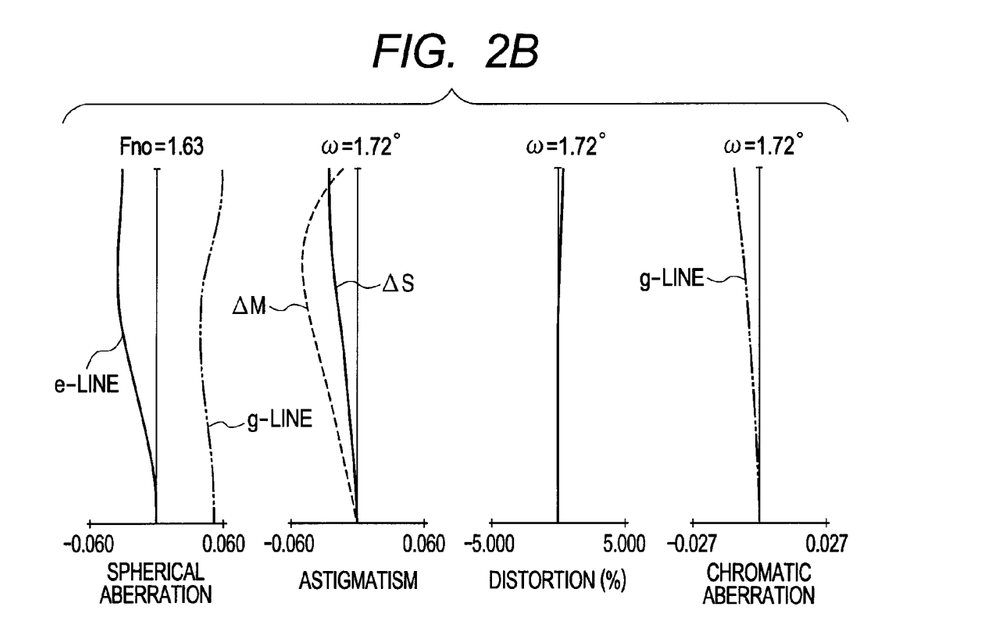
FIG. 2B is an aberration graph at a telephoto end according to Numerical Embodiment 1.

FIG. 1 is a lens cross sectional view at a wide-angle end according to Numerical Embodiment 1 corresponding to a first embodiment of the present invention. FIG. 2A is an aberration graph at a zoom position of the wide-angle end according to Numerical Embodiment 1 and FIG. 2B is an aberration graph at a zoom position of a telephoto end according to Numerical Embodiment 1.

Figure 3:
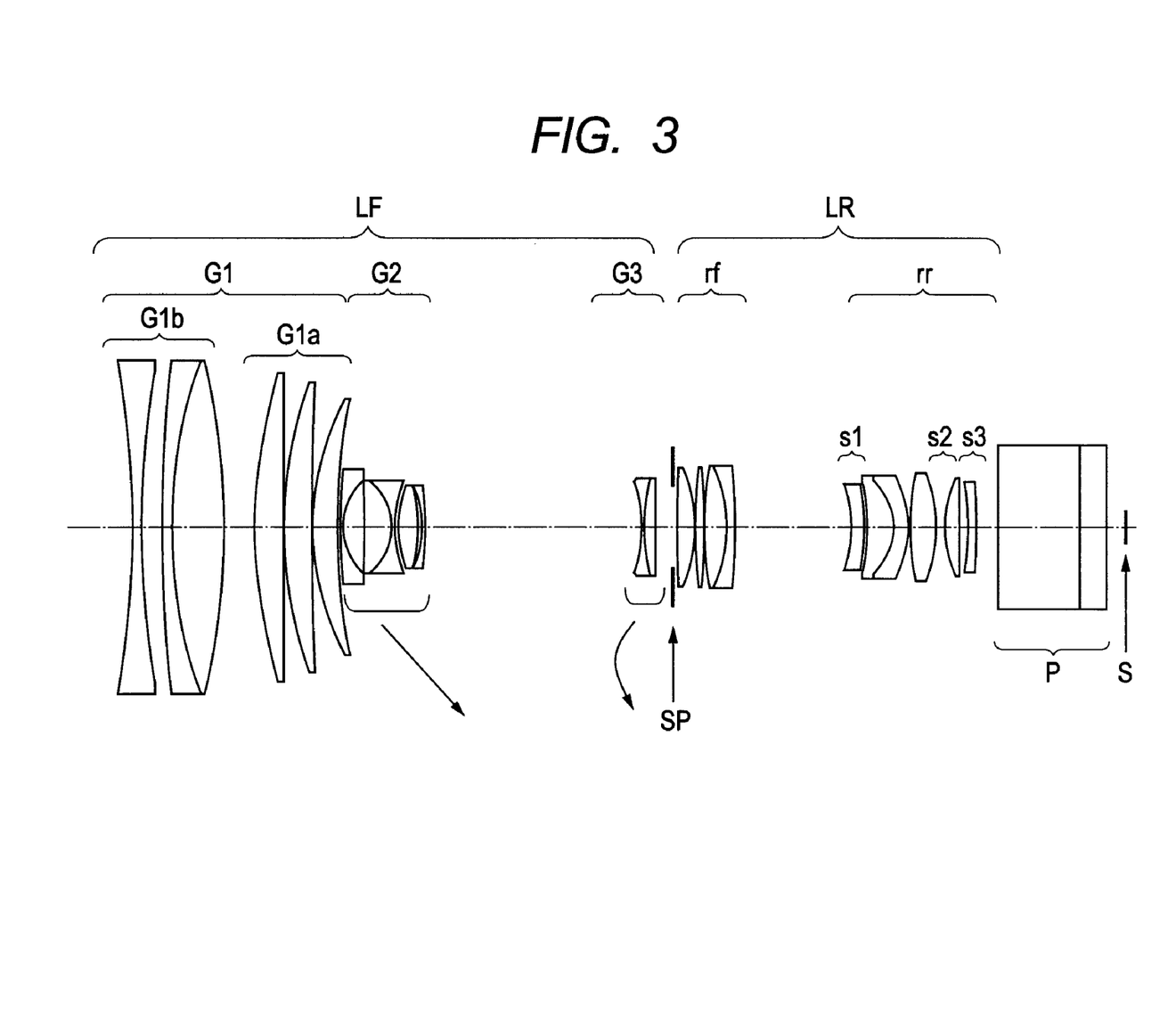
FIG. 3 is a lens cross sectional view at a wide-angle end according to Numerical Embodiment 2.
Figure 4A:
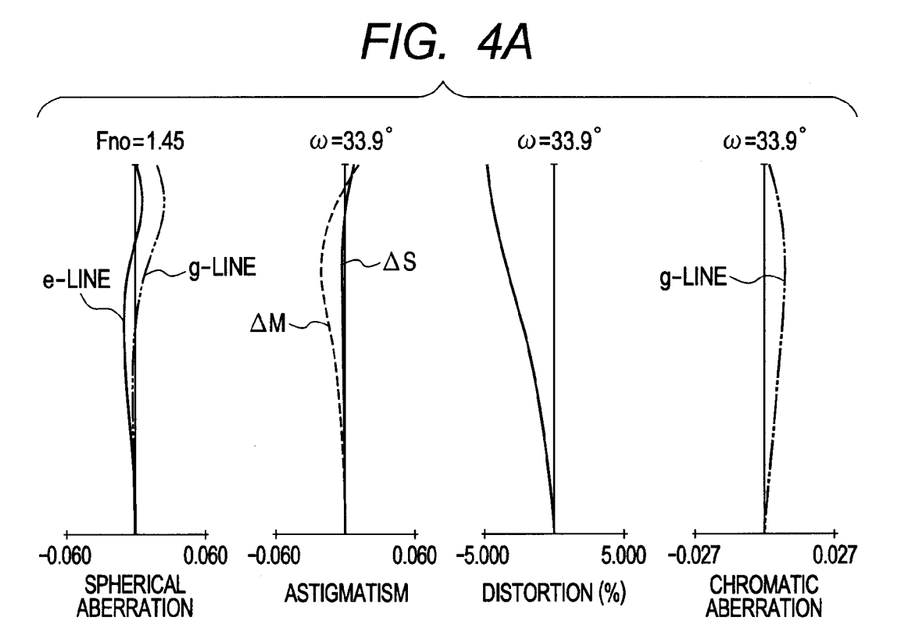
FIG. 4A is an aberration graph at the wide-angle end according to Numerical Embodiment 2.
Figure 4B:
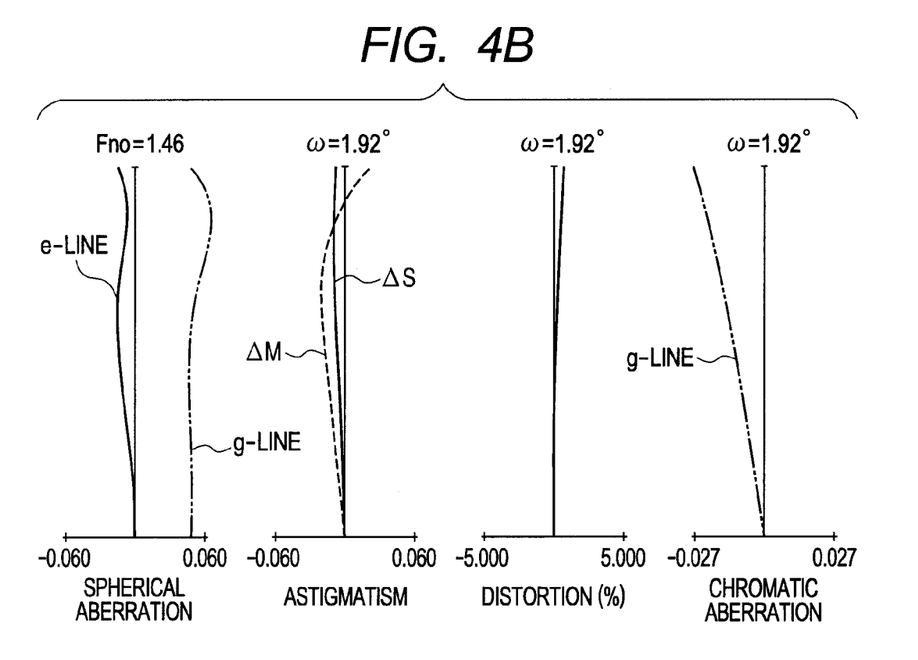
FIG. 4B is an aberration graph at a telephoto end according to Numerical Embodiment 2.

FIG. 3 is a lens cross sectional view at a wide-angle end according to Numerical Embodiment 2 corresponding to a second embodiment of the present invention. FIG. 4A is an aberration graph at a zoom position of the wide-angle end according to Numerical Embodiment 2 and FIG. 4B is an aberration graph at a zoom position of a telephoto end according to Numerical Embodiment 2.

Figure 5:
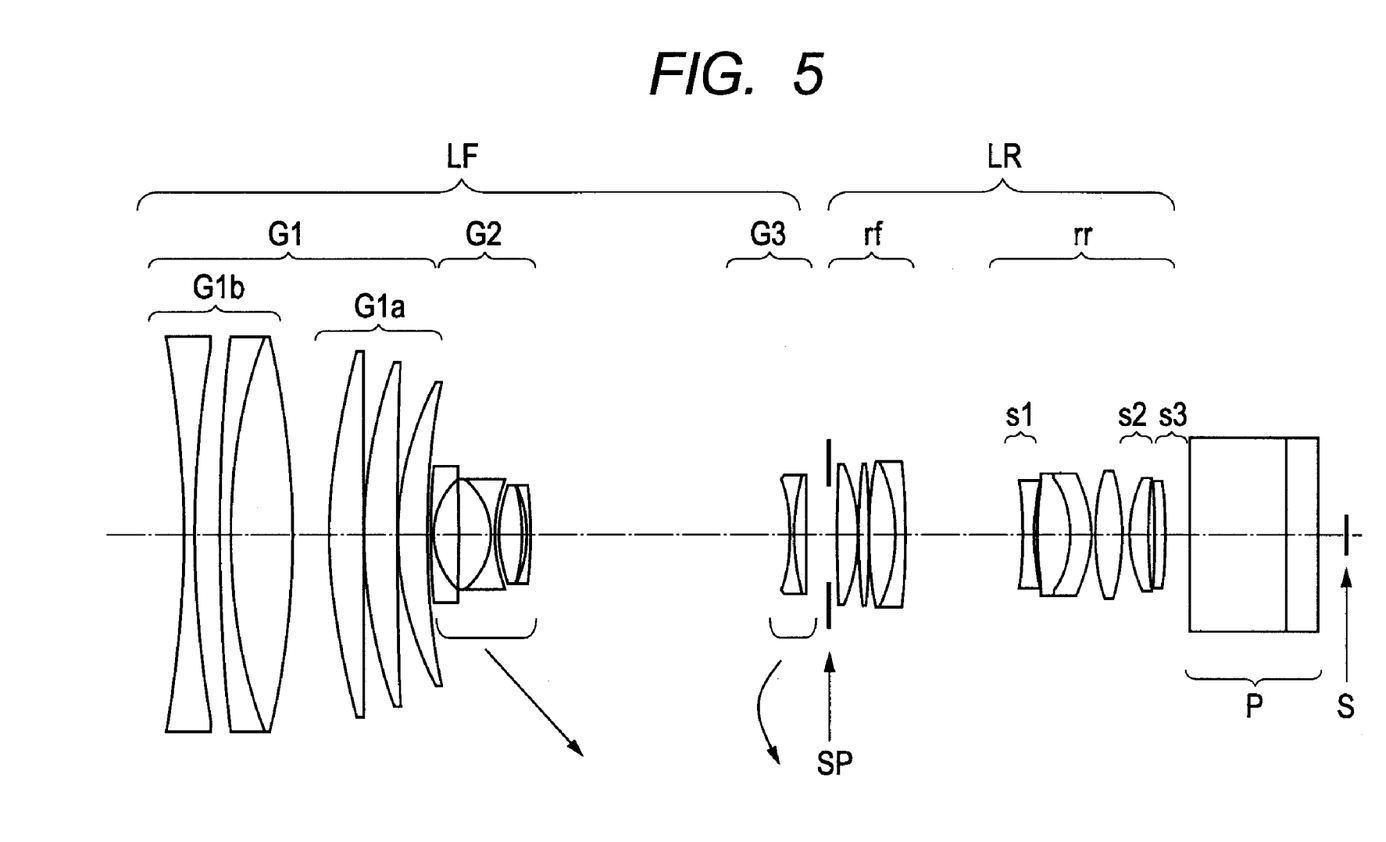
FIG. 5 is a lens cross sectional view at a wide-angle end according to Numerical Embodiment 3.
Figure 6A:
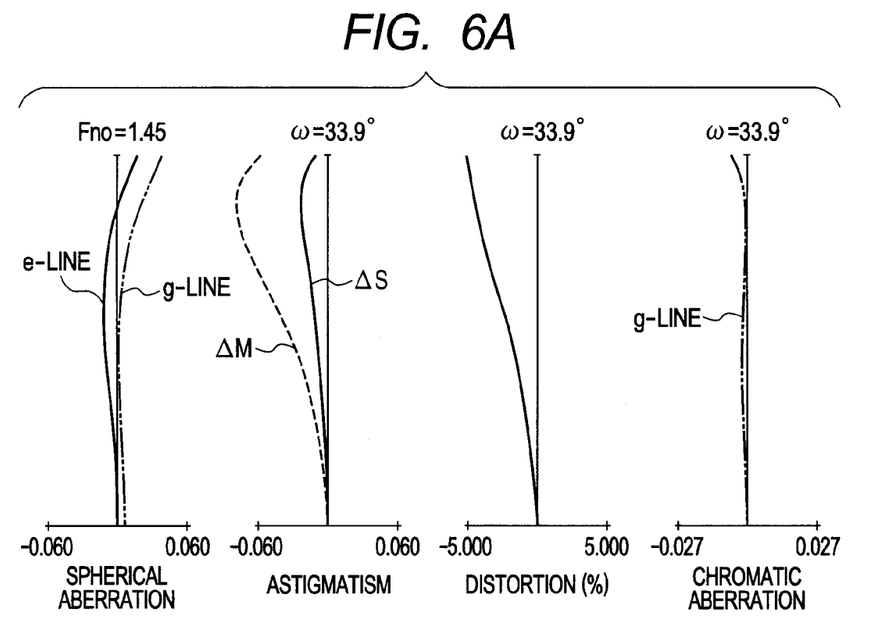
FIG. 6A is an aberration graph at the wide-angle end according to Numerical Embodiment 3.
Figure 6B:
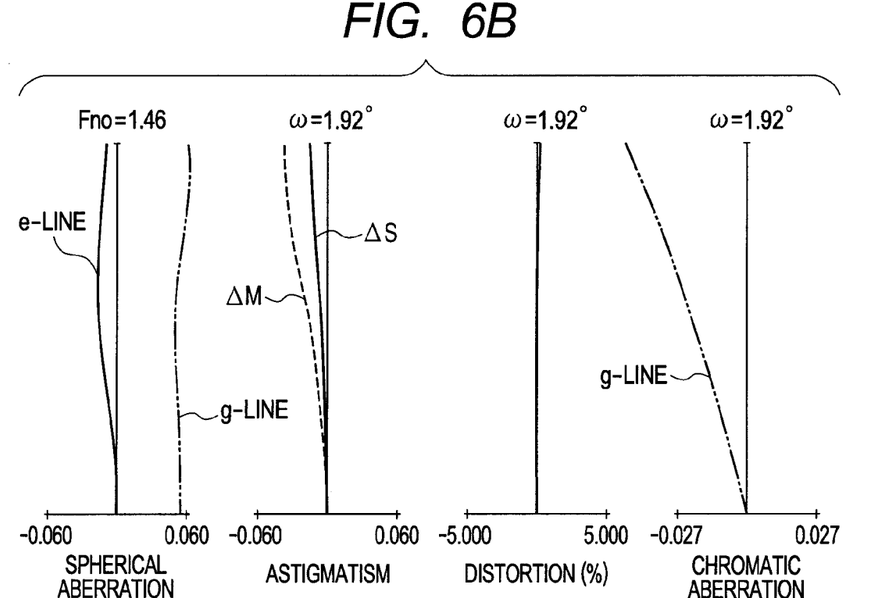
FIG. 6B is an aberration graph at a telephoto end according to Numerical Embodiment 3.

FIG. 5 is a lens cross sectional view at a wide-angle end according to Numerical Embodiment 3 corresponding to a third embodiment of the present invention. FIG. 6A is an aberration graph at a zoom position of the wide-angle end according to Numerical Embodiment 3 and FIG. 6B is an aberration graph at a zoom position of a telephoto end according to Numerical Embodiment 3.

Figure 7:
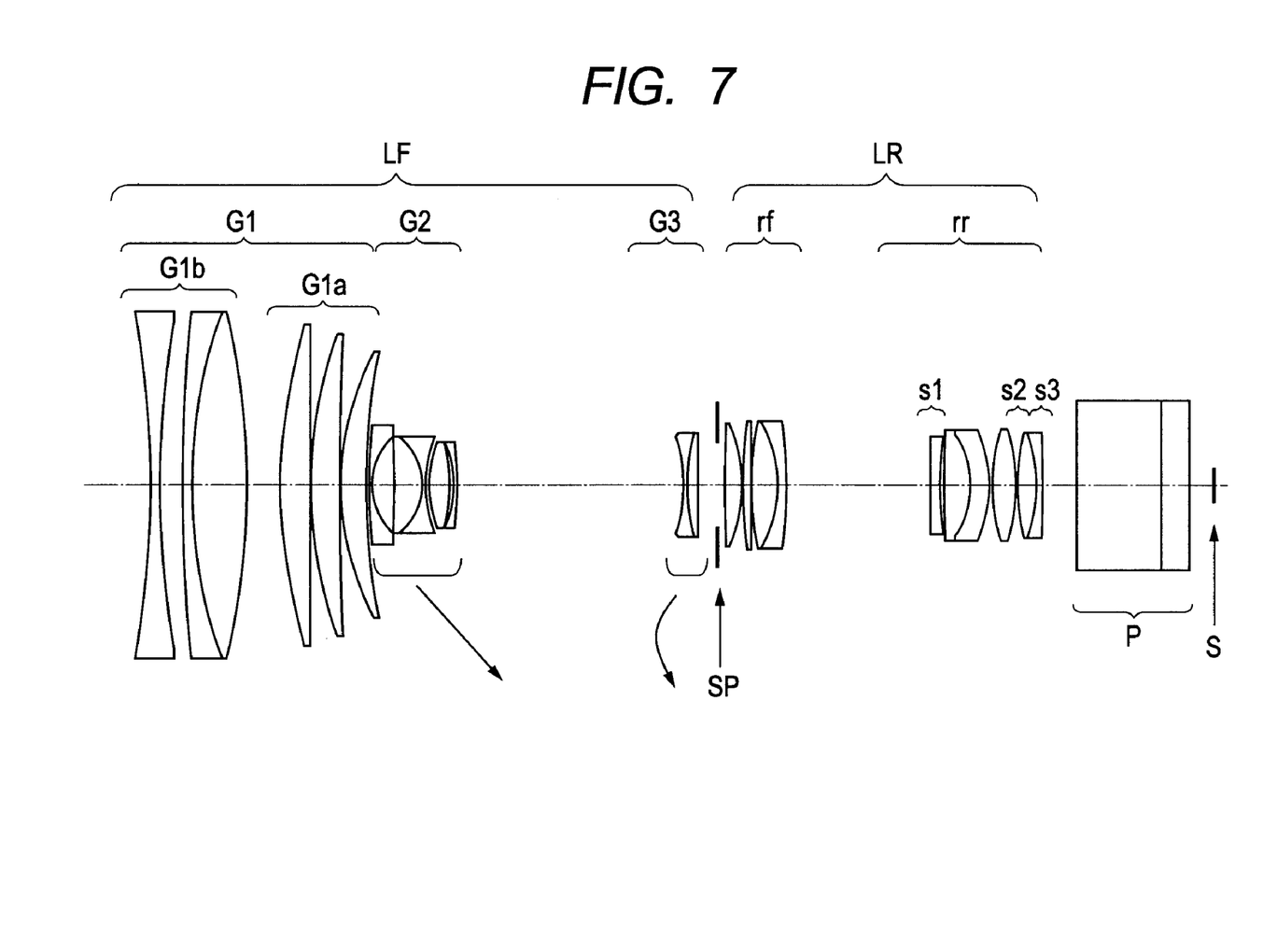
FIG. 7 is a lens cross sectional view at a wide-angle end according to Numerical Embodiment 4.
Figure 8A:
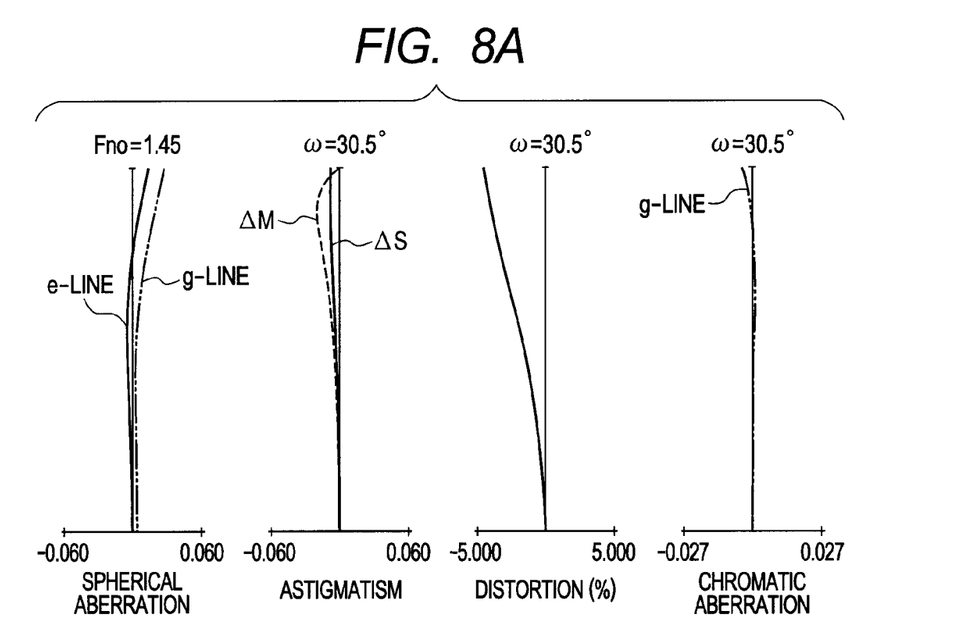
FIG. 8A is an aberration graph at the wide-angle end according to Numerical Embodiment 4.
Figure 8B:
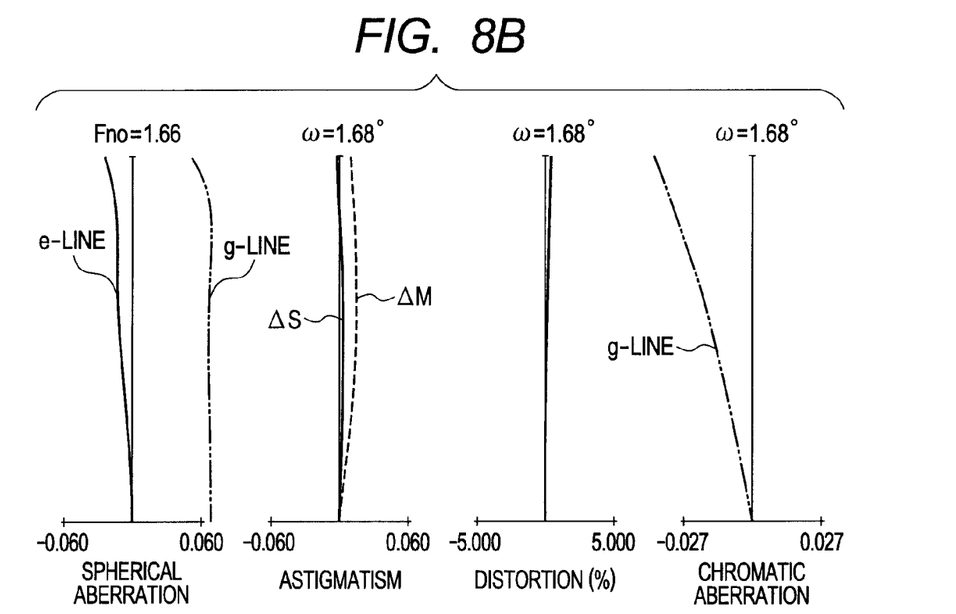
FIG. 8B is an aberration graph at a telephoto end according to Numerical Embodiment 4.

FIG. 7 is a lens cross sectional view at a wide-angle end according to Numerical Embodiment 4 corresponding to a fourth embodiment of the present invention. FIG. 8A is an aberration graph at a zoom position of the wide-angle end according to Numerical Embodiment 4 and FIG. 8B is an aberration graph at a zoom position of a telephoto end according to Numerical Embodiment 4.

Figure 9:
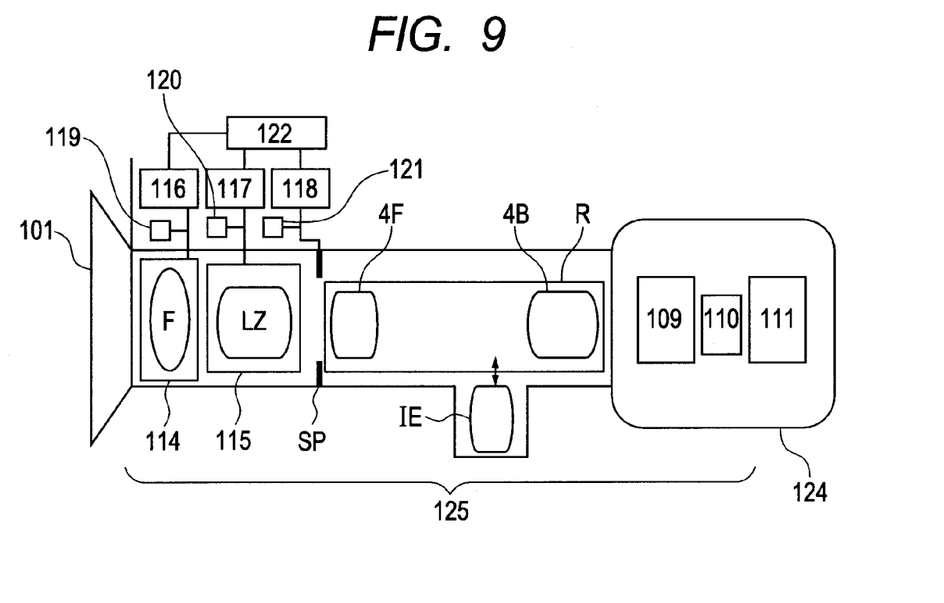
FIG. 9 is a schematic diagram illustrating a principal part of an image pickup apparatus according to the present invention.

FIG. 9 is a schematic diagram illustrating a principal part of an image pickup apparatus according to the present invention. The zoom lens according to each of the embodiments is an image taking lens system used for image pickup apparatuses such as a TV camera, a video camera and a digital camera. In the lens cross sectional views, the left is a subject side (object side) (front side) and the right is the image side (rear side).

In the lens cross sectional views, the front lens group LF includes a focusing portion (focus portion) and a magnification-varying portion. The rear lens group LR has a positive refractive power and serves to perform an imaging action, which is not moved for magnification-varying (zooming). Arrows exhibit movement loci of the respective lens units during zooming from the wide-angle end to the telephoto end. The front lens group LF includes the three lens units G1, G2 and G3. The lens unit (first lens unit) G1 is not moved for zooming and serves as a lens unit having a positive refractive power.

The lens unit G1 includes, in order from the object side (magnification side) to the image side (reduction side), a first lens subunit G1b which is fixed (not moved for focusing) and a second lens subunit G1a (which is desirably a lens unit having positive refractive power) moved for focusing. When the second lens subunit G1a is moved toward the object side for focusing from an infinite distance object to a close distance object, focusing up to an object distance (distance from image plane obtained in a case where Numerical Embodiments described later are exhibited in units of mm) of 0.8 m may be achieved.

The lens unit (second lens unit) G2 is a variator having a negative refractive power for magnification-varying and is moved to the image plane side on the optical axis as indicated by the arrow for magnification-varying (zooming) from the wide-angle end to the telephoto end.

The lens unit (third lens unit) G3 is a compensator having a negative refractive power and is nonlinearly moved along a locus convex toward the object side on the optical axis as indicated by the arrow in order to correct an image plane variation due to magnification-varying. The zoom lens further includes the aperture stop SP.

The rear lens group (fourth lens unit) LR includes the lens unit (front lens unit) rf having the positive refractive power, which is located on the object side of the maximum air interval of the rear lens group LR, and the lens unit (rear lens unit) rr having the positive refractive power, which is located on the image plane side of the maximum air interval thereof. A focal length converter (extender) for shifting a focal length range of the entire system, for example, may be inserted into the air interval between the front lens unit rf and the rear lens unit rr.

The rear lens unit rr includes the lens s1 having the negative refractive power, which is located on the most object side, and the lens s3 having the negative refractive power, which is located on the most image side. The rear lens unit rr further includes the lens s2 having the positive refractive power, which is located on the object side of and adjacent to the lens s3.

The lenses (lens elements or optical elements) s2 and s3 may be separately provided or cemented to each other to serve as a cemented lens. The rear lens unit rr may include a cemented lens obtained by cementing the lenses s1, s2 and s3. When at least two of the lenses s1, s2 and s3 serve as a cemented lens, a refractive power (focal length) obtained under a state in which the respective lenses are separately disposed in air is obtained.

A color separation prism or optical filter P is provided as a glass block in the drawings. An image pickup element S is a CCD or a CMOS element. For example, a ⅓-inch CCD is used as the image pickup element.

In the aberration graphs, a spherical aberration relates to a g-line (436 nm in wavelength) and an e-line (546 nm in wavelength). In the astigmatism graphs, $\Delta M$ and $\Delta S$ exhibit a meridional image plane and a sagittal image plane, respectively. A lateral chromatic aberration relates to the g-line. In addition, Fno indicates an F number and ω indicates a half angle of field.

In each embodiment, the following conditional expressions are satisfied:

$$-6.0 \leq fs1/frr \leq -1.0 \quad (1); \text{ and}$$

$$-9.0 \leq fs3/frr \leq -2.0 \quad (2),$$

where frr indicates a focal length of the rear lens unit, and fs1 and fs3 indicate a focal length of the lens s1 and a focal length of the lens s3, respectively.

When the lenses are cemented, the focal lengths described above are focal lengths obtained in a case where the lenses are separately provided in air (the same applies to the following). Hereinafter, the technical meanings of respective conditional expressions are described.

Conditional Expression (1) relates to a ratio between the focal length frr of the fixed rear lens unit rr having the positive refractive power and the focal length fs1 of the lens s1 having the negative refractive power.

The ratio between the focal lengths is defined as exhibited in Conditional Expression (1), and hence an exit pupil is located far away from the image plane while a long back focus is maintained.

When the focal length fs1 becomes shorter and thus fs1/frr exceeds an upper limit of Conditional Expression (1), the exit pupil is located close to the image plane. As a result, white shading significantly occurs.

When the focal length fs1 becomes longer and thus fs1/frr is smaller than a lower limit of Conditional Expression (1), the back focus shortens. As a result, it is difficult to ensure a space for disposing the color separation prism on the image side.

Conditional Expression (2) relates to a ratio between the focal length frr of the fixed rear lens unit rr having the positive refractive power and the focal length fs3 of the lens s3 having the negative refractive power.

The ratio between the focal lengths is defined as exhibited in Conditional Expression (2), and hence the exit pupil is located far away from the image plane while a long back focus is maintained.

When the focal length fs3 becomes shorter and thus fs3/frr exceeds an upper limit of Conditional Expression (2), an axial ray is refracted by the negative refractive power. Therefore, it is necessary to increase diameters of the lenses of the rear lens unit rr, and hence it is difficult to achieve reduction in size and weight.

When the focal length fs3 becomes longer and thus fs3/frr is smaller than a lower limit of Conditional Expression (2), the exit pupil is located close to the image plane and the back focus shortens. As a result, it is difficult to ensure the space for disposing the color separation prism on the image side. Further, white shading significantly occurs.

The numerical ranges of Conditional Expressions (1) and (2) are more preferably set as follows.

$$-5.7 \leq fs1/frr \leq -1.1 \quad (1a)$$

$$-8.80 \leq fs3/frr \leq -2.05 \quad (2a)$$

As described above, according to the respective embodiments, the zoom lens is obtained in which the exit pupil may be located far away from the image plane while the long back focus is maintained.

In the zoom lens according to the present invention, at least one of the following conditional expressions is more preferably satisfied.

Assume that fs2 indicates a focal length of the lens s2.

Assume that DLR indicates a total length (interval between lens surface located on the most object side and lens surface located on the most image side, the same applies to the following) of the rear lens group LR, and drr indicates a total length of the rear lens unit rr.

Assume that frf indicates a focal length of the front lens unit rf.

Assume that ds indicates an interval between the front lens unit rf and the rear lens unit rr.

In this case, at least one of the following conditional expressions is preferably satisfied.

$$-4.0 \leq fs3/fs2 \leq -1.5 \quad (3)$$

$$2.0 \leq DLR/drr \leq 3.0 \quad (4)$$

$$1.0 \leq frf/frr \leq 1.4 \quad (5)$$

$$0.45 \leq ds/frf \leq 1.10 \quad (6)$$

Conditional Expression (3) relates to a ratio between the focal length of the lens S3 and the focal length of the lens s2 having the positive refractive power.

The ratio between the focal lengths is defined as exhibited in Conditional Expression (3), and hence the exit pupil is located far away from the image plane while a long back focus is maintained.

When the focal length fs3 becomes shorter or the focal length fs2 becomes longer, and thus fs3/fs2 exceeds an upper limit of Conditional Expression (3), the axial ray is refracted by the negative refractive power. Therefore, it is necessary to increase the diameters of the lenses of the rear lens unit rr, and hence it is difficult to achieve reduction in size and weight.

When the focal length fs3 becomes longer or the focal length fs2 becomes shorter, and thus fs3/fs2 is smaller than a lower limit of Conditional Expression (3), the exit pupil is located close to the image plane and the back focus shortens. As a result, it is difficult to ensure the space for disposing the color separation prism on the image side. Further, white shading significantly occurs.

Conditional Expression (4) defines a ratio between a total length of the rear lens group LR and a total length of the rear lens unit rr.

The total length ratio between the rear lens group LR and the rear lens unit rr is defined as expressed in Conditional Expression (4), and hence the exit pupil is located far away from the image plane and a space into which the extender may be inserted is ensured.

When the total length DLR increases or the total length drr reduces and thus DLR/drr exceeds an upper limit of Conditional Expression (4), a principal point of the rear lens unit rr is located away from a stop position and the exit pupil is located close to the image plane.

When the total length DLR reduces or the total length drr increases and thus DLR/drr is smaller than a lower limit of Conditional Expression (4), the exit pupil is located away from the image plane, but the space into which the extender is inserted is reduced. This is not desirable.

Conditional Expression (5) defines a ratio between the focal length of the front lens unit rf and the focal length of the rear lens unit rr. The focal length ratio is defined as expressed in Conditional Expression (5) to obtain excellent optical performance.

When the focal length frf becomes larger or the focal length frr becomes smaller and thus frf/frr exceeds an upper limit of Conditional Expression (5), various aberrations significantly occur in the rear lens unit rr, and hence it is difficult to obtain excellent optical performance. In order to improve the optical performance, it is necessary to increase the number of lenses of the rear lens unit rr. As a result, the entire system is increased in size. This is not desirable.

When the focal length frf becomes smaller or the focal length frr becomes larger and thus frf/frr is smaller than a lower limit of Conditional Expression (5), various aberrations significantly occurs in the front lens unit rf, and hence it is difficult to obtain excellent optical performance. In order to improve the optical performance, it is necessary to increase the number of lenses of the front lens unit rf. As a result, the entire system is increased in size. This is not desirable.

Conditional Expression (6) is used to suitably set the interval between the front lens unit rf and the rear lens unit rr, and hence the exit pupil is located far away from the image plane while the long back focus is maintained.

When ds/frf exceeds an upper limit of Conditional Expression (6), the interval between the front lens unit rf and the rear lens unit rr increases and the focal length frf shortens, and hence the exit pupil is located in a close position. Therefore, white shading occurs.

When ds/frf is smaller than a lower limit of Conditional Expression (6), the interval between the front lens unit rf and the rear lens unit rr reduces and the focal length frf lengthens, and hence a space into which the extender (magnification-varying optical system) or a filter is inserted is reduced (confined). This is not desirable.

The numerical ranges of Conditional Expressions (3) to (6) are more preferably set as follows.

$$-3.7 \leq fs3/fs2 \leq -1.6 \quad (3a)$$

$$2.20 \leq DLR/drr \leq 2.95 \quad (4a)$$

$$1.10 \leq frf/frr \leq 1.38 \quad (5a)$$

$$0.50 \leq ds/frf \leq 1.00 \quad (6a)$$

Any of Numerical Embodiments 1 to 4 described later satisfies Conditional Expressions (1) to (6), and hence the exit pupil is set in a sufficient distance from the image plane while a back focus corresponding to a length necessary to dispose a prism is ensured.

In the respective embodiments, the front lens unit rf includes, in order from the object side to the image side, a positive lens, a positive lens, and a cemented lens obtained by cementing a positive lens and a negative lens. The rear lens unit rr includes, in order from the object side to the image side, the negative lens (lens s1), a cemented lens obtained by cementing a positive lens and a negative lens, a positive lens, the positive lens (lens s2), and the negative lens (lens s3).

Hereinafter, Numerical Embodiments 1 to 4 respectively corresponding to the first to fourth embodiments of the present invention are described. In the respective numerical embodiments, a surface number "i" is counted from the object side. In addition, ri indicates a curvature radius of an i-th surface counted from the object side, and di indicates an interval between the i-th surface and an (i+1)-th surface which are counted from the object side. Further, ndi and vdi indicate a refractive index and an Abbe number of an i-th optical material, respectively. The focal length, an F number and an angle of field are values obtained in a case of focusing on the infinite distance object. The back focus (BF) is expressed as an equivalent air length corresponding to a distance between a final lens surface and the image plane. Last three surfaces are surfaces of, the glass block, for example, the filter. Aspherical coefficients are indicated by A3 to A12. When a displacement from a surface vertex in the optical axis direction at a position corresponding to a height H from the optical axis is indicated by X, an aspherical shape is expressed as follows.

$$X = \frac{(1/R)H^2}{1+\sqrt{1-(1+K)(H/R)^2}} + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} + A11 \cdot H^{11} + A12 \cdot H^{12} \quad \text{(Eq. 1)}$$

where R indicates a paraxial curvature radius and K indicates a conic constant. In addition, "e-X" indicates "×10$^{-x}$". Further, BF (in air) indicates an in-air distance between the final lens surface and the image plane. The position of the exit pupil is relative to the position of the image plane. Relationships between the respective conditional expressions given above and the numerical embodiments are shown in Table 1.

Numerical Embodiment 1

Unit: mm

Surface data

| Surface Number | r | d | nd | vd | Effective diameter |
|---|---|---|---|---|---|
| 1 | −248.450 | 2.30 | 1.74950 | 35.3 | 81.91 |
| 2 | 209.479 | 5.49 | | | 80.59 |
| 3 | 391.268 | 2.30 | 1.80518 | 25.4 | 80.78 |
| 4 | 121.284 | 13.79 | 1.60300 | 65.4 | 80.34 |
| 5 | −162.815 | 7.48 | | | 80.37 |
| 6 | 127.510 | 7.34 | 1.43875 | 94.9 | 77.06 |
| 7 | −55946.739 | 0.15 | | | 76.52 |
| 8 | 106.101 | 6.89 | 1.61800 | 63.3 | 72.74 |
| 9 | 865.964 | 0.15 | | | 71.97 |
| 10 | 69.050 | 5.83 | 1.72916 | 54.7 | 64.32 |
| 11 | 158.452 | (Variable) | | | 63.23 |
| 12* | 228.519 | 0.70 | 1.88300 | 40.8 | 28.55 |
| 13 | 16.094 | 5.93 | | | 23.06 |
| 14 | −123.223 | 6.59 | 1.80518 | 25.4 | 22.82 |
| 15 | −15.129 | 0.70 | 1.75500 | 52.3 | 22.46 |
| 16 | 30.692 | 0.68 | | | 20.59 |
| 17 | 23.413 | 5.61 | 1.60342 | 38.0 | 20.71 |
| 18 | −39.635 | 0.88 | | | 20.13 |
| 19 | −24.853 | 0.70 | 1.83481 | 42.7 | 20.08 |
| 20 | −134.691 | (Variable) | | | 20.05 |
| 21 | −28.312 | 0.70 | 1.74320 | 49.3 | 21.02 |
| 22 | 46.740 | 2.80 | 1.84666 | 23.8 | 23.02 |
| 23 | −2634.956 | (Variable) | | | 23.58 |
| 24 (Stop) | ∞ | 1.30 | | | 19.88 |
| 25 | 360.024 | 4.38 | 1.65844 | 50.9 | 28.54 |
| 26 | −34.891 | 0.15 | | | 28.95 |
| 27 | 93.089 | 2.20 | 1.49700 | 81.5 | 29.52 |
| 28 | −3728.151 | 0.15 | | | 29.49 |
| 29 | 89.504 | 6.00 | 1.49700 | 81.5 | 29.43 |
| 30 | −32.080 | 1.80 | 1.77250 | 49.6 | 29.25 |
| 31 | −210.910 | 21.87 | | | 29.56 |
| 32 | −25.380 | 3.06 | 1.80518 | 25.4 | 21.34 |
| 33 | −32.854 | 0.70 | | | 22.69 |
| 34 | −39.348 | 5.02 | 1.48749 | 70.2 | 22.82 |
| 35 | −16.979 | 3.01 | 1.88300 | 40.8 | 23.41 |
| 36 | −25.043 | 1.00 | | | 25.82 |
| 37 | 73.013 | 4.36 | 1.49700 | 81.5 | 26.32 |
| 38 | −70.502 | 0.72 | | | 26.19 |
| 39 | 31.556 | 7.07 | 1.49700 | 81.5 | 24.88 |
| 40 | −45.564 | 2.59 | | | 23.47 |
| 41 | −36.072 | 2.64 | 1.80518 | 25.4 | 20.37 |
| 42 | −72.351 | 5.00 | | | 19.49 |
| 43 | ∞ | 21.00 | 1.70154 | 41.2 | 40.00 |
| 44 | ∞ | 6.75 | 1.51680 | 64.2 | 40.00 |

-continued

Unit: mm

| 45 | ∞ | 4.70 | | 40.00 |
|---|---|---|---|---|
| Image plane | ∞ | | | |

Aspherical surface data
Twelfth surface

| K = 8.58860e+000 | A4 = 7.05382e−006 | A6 = −1.80303e−008 |
|---|---|---|
| A8 = 7.49637e−011 | A10 = −8.01854e−013 | A12 = 5.80206e−015 |
| A3 = 450041e−007 | A5 = 1.66019e−008 | A7 = −8.87373e−010 |
| A9 = 1.99340e−011 | A11 = −1.17115e−013 | |

Various data
Zoom ratio 20.00

| Focal length | 4.94 | 9.88 | 20.06 | 65.87 | 98.80 |
|---|---|---|---|---|---|
| F number | 1.45 | 1.45 | 1.45 | 1.45 | 1.61 |
| Half angle of field | 31.27 | 16.89 | 8.51 | 2.61 | 1.74 |
| Image height | 3.00 | 3.00 | 3.00 | 3.00 | 3.00 |
| Total lens length | 242.75 | 242.75 | 242.75 | 242.75 | 242.75 |
| BF (in air) | 26.49 | 26.49 | 26.49 | 26.49 | 26.49 |
| d11 | 0.85 | 22.26 | 36.83 | 50.73 | 53.23 |
| d20 | 55.23 | 30.79 | 13.88 | 3.50 | 5.98 |
| d23 | 4.20 | 7.23 | 9.57 | 6.05 | 1.08 |
| Entrance pupil position | 50.90 | 101.83 | 186.73 | 469.30 | 620.01 |
| Exit pupil position | 65.04 | 65.04 | 65.04 | 65.04 | 65.04 |
| Front principal point position | 56.25 | 113.33 | 213.46 | 607.07 | 880.59 |
| Rear principal point position | −0.24 | −5.18 | −15.36 | −61.17 | −94.10 |

Zoom lens unit data

| Unit | Leading surface | Focal length | Lens structure length | Front principal point position | Rear principal point position |
|---|---|---|---|---|---|
| 1 | 1 | 71.00 | 51.73 | 32.98 | 0.64 |
| 2 | 12 | −13.70 | 21.79 | 2.59 | −11.43 |
| 3 | 21 | −42.20 | 3.50 | −0.07 | −1.98 |
| 4 | 24 | 36.71 | 15.97 | 3.26 | −7.36 |
| 5 | 32 | 30.76 | 62.91 | 13.78 | −25.51 |

Single lens data

| Lens | Leading surface | Focal length |
|---|---|---|
| 1 | 1 | −150.30 |
| 2 | 3 | −217.12 |
| 3 | 4 | 116.99 |
| 4 | 6 | 289.24 |
| 5 | 8 | 194.25 |
| 6 | 10 | 162.62 |
| 7 | 12 | −19.52 |
| 8 | 14 | 20.66 |
| 9 | 15 | −13.27 |
| 10 | 17 | 25.08 |
| 11 | 19 | −36.41 |
| 12 | 21 | −23.52 |
| 13 | 22 | 53.74 |
| 14 | 25 | 48.30 |
| 15 | 27 | 182.24 |
| 16 | 29 | 48.17 |
| 17 | 30 | −48.96 |
| 18 | 32 | −168.13 |
| 19 | 34 | 56.87 |
| 20 | 35 | −72.01 |
| 21 | 37 | 72.69 |
| 22 | 39 | 38.58 |
| 23 | 41 | −91.51 |
| 24 | 43 | 0.00 |
| 25 | 44 | 0.00 |

Numerical Embodiment 2

Unit: mm

Surface data

| Surface Number | r | d | nd | vd | Effective diameter |
|---|---|---|---|---|---|
| 1 | −248.450 | 2.30 | 1.74950 | 35.3 | 81.91 |
| 2 | 209.479 | 5.49 | | | 80.59 |
| 3 | 391.268 | 2.30 | 1.80518 | 25.4 | 80.78 |
| 4 | 121.284 | 13.79 | 1.60300 | 65.4 | 80.34 |
| 5 | −162.815 | 7.48 | | | 80.37 |
| 6 | 127.510 | 7.34 | 1.43875 | 94.9 | 77.06 |
| 7 | −55946.739 | 0.15 | | | 76.52 |
| 8 | 106.101 | 6.89 | 1.61800 | 63.3 | 72.74 |
| 9 | 865.964 | 0.15 | | | 71.97 |
| 10 | 69.050 | 5.83 | 1.72916 | 54.7 | 64.32 |
| 11 | 158.452 | (Variable) | | | 63.23 |
| 12* | 228.519 | 0.70 | 1.88300 | 40.8 | 28.55 |
| 13 | 16.094 | 5.93 | | | 23.06 |
| 14 | −123.223 | 6.59 | 1.80518 | 25.4 | 22.82 |
| 15 | −15.129 | 0.70 | 1.75500 | 52.3 | 22.46 |
| 16 | 30.692 | 0.68 | | | 20.59 |
| 17 | 23.413 | 5.61 | 1.60342 | 38.0 | 20.71 |
| 18 | −39.635 | 0.88 | | | 20.13 |
| 19 | −24.853 | 0.70 | 1.83481 | 42.7 | 20.08 |
| 20 | −134.691 | (Variable) | | | 20.05 |
| 21 | −28.312 | 0.70 | 1.74320 | 49.3 | 21.02 |
| 22 | 46.740 | 2.80 | 1.84666 | 23.8 | 23.02 |
| 23 | −2634.956 | (Variable) | | | 23.58 |
| 24 (Stop) | ∞ | 1.30 | | | 17.98 |
| 25 | 360.024 | 4.38 | 1.65844 | 50.9 | 28.54 |
| 26 | −34.891 | 0.15 | | | 28.95 |
| 27 | 93.089 | 2.20 | 1.48749 | 70.2 | 29.52 |
| 28 | −3728.151 | 0.15 | | | 29.49 |
| 29 | 89.504 | 6.00 | 1.48749 | 70.2 | 29.43 |
| 30 | −32.080 | 1.80 | 1.77250 | 49.6 | 29.25 |
| 31 | −210.910 | 29.53 | | | 29.56 |
| 32 | −28.796 | 3.00 | 1.80518 | 25.4 | 19.46 |
| 33 | −54.120 | 0.70 | | | 20.63 |
| 34 | −55.093 | 7.25 | 1.57099 | 50.8 | 20.81 |
| 35 | −14.735 | 3.64 | 1.88300 | 40.8 | 21.84 |
| 36 | −26.882 | 0.30 | | | 24.95 |
| 37 | 63.443 | 6.89 | 1.49700 | 81.5 | 25.82 |
| 38 | −32.564 | 2.00 | | | 25.77 |
| 39 | 26.516 | 3.69 | 1.49700 | 81.5 | 23.29 |
| 40 | ∞ | 2.35 | | | 22.76 |
| 41 | −54.286 | 2.09 | 1.80518 | 25.4 | 21.71 |
| 42 | −132.538 | 5.00 | | | 21.07 |
| 43 | ∞ | 21.00 | 1.70154 | 41.2 | 40.00 |
| 44 | ∞ | 6.75 | 1.51680 | 64.2 | 40.00 |
| 45 | ∞ | 4.71 | | | 40.00 |
| Image plane | ∞ | | | | |

Aspherical surface data
Twelfth surface

| K = 8.58860e+000 | A4 = 7.05382e−006 | A6 = −1.80303e−008 |
|---|---|---|
| A8 = 7.49637e−011 | A10 = −8.01854e−013 | A12 = 5.80206e−015 |
| A3 = −4.50041e−007 | A5 = 1.66019e−008 | A7 = −8.87373e−010 |
| A9 = 1.99340e−011 | A11 = −1.17115e−013 | |

Various data
Zoom ratio 20.00

| Focal length | 4.47 | 8.94 | 18.16 | 59.63 | 89.44 |
|---|---|---|---|---|---|
| F number | 1.45 | 1.45 | 1.45 | 1.45 | 1.46 |
| Half angle of field | 33.86 | 18.54 | 9.38 | 2.88 | 1.92 |
| Image height | 3.00 | 3.00 | 3.00 | 3.00 | 3.00 |
| Total lens length | 252.25 | 252.25 | 252.25 | 252.25 | 252.25 |
| BF (in air) | 26.50 | 26.50 | 26.50 | 26.50 | 26.50 |
| d11 | 0.85 | 22.26 | 36.83 | 50.73 | 53.23 |
| d20 | 55.23 | 30.79 | 13.88 | 3.50 | 5.98 |
| d23 | 4.28 | 7.31 | 9.65 | 6.13 | 1.16 |
| Entrance pupil position | 50.90 | 101.84 | 186.78 | 469.76 | 621.05 |
| Exit pupil position | 32.60 | 32.60 | 32.60 | 32.60 | 32.60 |

-continued

Unit: mm

| | | | | | |
|---|---|---|---|---|---|
| Front principal point position | 56.09 | 113.65 | 216.75 | 656.87 | 997.33 |
| Rear principal point position | 0.24 | −4.24 | −13.45 | −54.92 | −84.73 |

Zoom lens unit data

| Unit | Leading surface | Focal length | Lens structure length | Front principal point position | Rear principal point position |
|---|---|---|---|---|---|
| 1 | 1 | 71.00 | 51.73 | 32.98 | 0.64 |
| 2 | 12 | −13.70 | 21.79 | 2.59 | −11.43 |
| 3 | 21 | −42.20 | 3.50 | −0.07 | −1.98 |
| 4 | 24 | 37.31 | 15.97 | 3.18 | −7.46 |
| 5 | 32 | 27.95 | 64.66 | 15.60 | −23.13 |

Single lens data

| Lens | Leading surface | Focal length |
|---|---|---|
| 1 | 1 | −150.30 |
| 2 | 3 | −217.12 |
| 3 | 4 | 116.99 |
| 4 | 6 | 289.24 |
| 5 | 8 | 194.25 |
| 6 | 10 | 162.62 |
| 7 | 12 | −19.52 |
| 8 | 14 | 20.66 |
| 9 | 15 | −13.27 |
| 10 | 17 | 25.08 |
| 11 | 19 | −36.41 |
| 12 | 21 | −23.52 |
| 13 | 22 | 53.74 |
| 14 | 25 | 48.30 |
| 15 | 27 | 185.71 |
| 16 | 29 | 49.07 |
| 17 | 30 | −48.96 |
| 18 | 32 | −79.98 |
| 19 | 34 | 32.91 |
| 20 | 35 | −42.73 |
| 21 | 37 | 44.23 |
| 22 | 39 | 53.19 |
| 23 | 41 | −114.51 |
| 24 | 43 | 0.00 |
| 25 | 44 | 0.00 |

Numerical Embodiment 3

Unit: mm

Surface data

| Surface Number | r | d | nd | vd | Effective diameter |
|---|---|---|---|---|---|
| 1 | −248.450 | 2.30 | 1.74950 | 35.3 | 81.91 |
| 2 | 209.479 | 5.49 | | | 80.59 |
| 3 | 391.268 | 2.30 | 1.80518 | 25.4 | 80.78 |
| 4 | 121.284 | 13.79 | 1.60300 | 65.4 | 80.34 |
| 5 | −162.815 | 7.48 | | | 80.37 |
| 6 | 127.510 | 7.34 | 1.43875 | 94.9 | 77.06 |
| 7 | −55946.739 | 0.15 | | | 76.52 |
| 8 | 106.101 | 6.89 | 1.61800 | 63.3 | 72.74 |
| 9 | 865.964 | 0.15 | | | 71.97 |
| 10 | 69.050 | 5.83 | 1.72916 | 54.7 | 64.32 |
| 11 | 158.452 | (Variable) | | | 63.23 |
| 12* | 228.519 | 0.70 | 1.88300 | 40.8 | 28.55 |
| 13 | 16.094 | 5.93 | | | 23.06 |
| 14 | −123.223 | 6.59 | 1.80518 | 25.4 | 22.82 |
| 15 | −15.129 | 0.70 | 1.75500 | 52.3 | 22.46 |
| 16 | 30.692 | 0.68 | | | 20.59 |
| 17 | 23.413 | 5.61 | 1.60342 | 38.0 | 20.71 |
| 18 | −39.635 | 0.88 | | | 20.13 |
| 19 | −24.853 | 0.70 | 1.83481 | 42.7 | 20.08 |
| 20 | −134.691 | (Variable) | | | 20.05 |
| 21 | −28.312 | 0.70 | 1.74320 | 49.3 | 21.02 |
| 22 | 46.740 | 2.80 | 1.84666 | 23.8 | 23.02 |
| 23 | −2634.956 | (Variable) | | | 23.58 |
| 24 (Stop) | ∞ | 1.30 | | | 18.22 |
| 25 | 360.024 | 4.38 | 1.65844 | 50.9 | 28.54 |
| 26 | −34.891 | 0.15 | | | 28.95 |
| 27 | 93.089 | 2.20 | 1.48749 | 70.2 | 29.52 |
| 28 | −3728.151 | 0.15 | | | 29.49 |
| 29 | 89.504 | 6.00 | 1.51633 | 64.1 | 29.43 |
| 30 | −32.080 | 1.80 | 1.88300 | 40.8 | 29.25 |
| 31 | −210.910 | 25.46 | | | 29.56 |
| 32 | −61.540 | 2.52 | 1.72000 | 50.2 | 20.46 |
| 33 | 44.099 | 0.70 | | | 21.18 |
| 34 | 75.791 | 7.05 | 1.48749 | 70.2 | 21.29 |
| 35 | −21.125 | 4.04 | 1.84666 | 23.8 | 22.36 |
| 36 | −29.468 | 1.03 | | | 24.66 |
| 37 | 36.936 | 6.04 | 1.48749 | 70.2 | 25.72 |
| 38 | −49.870 | 1.52 | | | 25.46 |
| 39 | 28.447 | 3.95 | 1.49700 | 81.5 | 22.83 |
| 40 | 145.824 | 1.69 | | | 21.83 |
| 41 | −78.347 | 2.00 | 1.84666 | 23.8 | 21.49 |
| 42 | −125.645 | 5.00 | | | 21.04 |
| 43 | ∞ | 21.00 | 1.70154 | 41.2 | 40.00 |
| 44 | ∞ | 6.75 | 1.51680 | 64.2 | 40.00 |
| 45 | ∞ | 6.59 | | | 40.00 |
| Image plane | ∞ | | | | |

Aspherical surface data
Twelfth surface

K = 8.58860e+000    A4 = 7.05382e−006    A6 = −1.80303e−008
A8 = 7.49637e−011    A10 = −8.01854e−013    A12 = 5.80206e−015
A3 = −4.50041e−007    A5 = 1.66019e−008    A7 = −8.87373e−010
A9 = 1.99340e−011    A11 = −1.17115e−013

Various data
Zoom ratio 20.00

| | | | | | |
|---|---|---|---|---|---|
| Focal length | 4.47 | 8.94 | 18.16 | 59.63 | 89.44 |
| F number | 1.45 | 1.45 | 1.45 | 1.45 | 1.46 |
| Half angle of field | 33.86 | 18.54 | 9.38 | 2.88 | 1.92 |
| Image height | 3.00 | 3.00 | 3.00 | 3.00 | 3.00 |
| Total lens length | 249.13 | 249.13 | 249.13 | 249.13 | 249.13 |
| BF (in air) | 28.38 | 28.38 | 28.38 | 28.38 | 28.38 |
| d11 | 0.85 | 22.26 | 36.83 | 50.73 | 53.23 |
| d20 | 55.23 | 30.79 | 13.88 | 3.50 | 5.98 |
| d23 | 4.73 | 7.76 | 10.10 | 6.58 | 1.61 |
| Entrance pupil position | 50.92 | 101.90 | 187.00 | 472.16 | 626.44 |
| Exit pupil position | 41.50 | 41.50 | 41.50 | 41.50 | 41.50 |
| Front principal point position | 55.96 | 113.13 | 214.60 | 633.61 | 944.99 |
| Rear principal point position | 2.12 | −2.36 | −11.57 | −53.04 | −82.85 |

Zoom lens unit data

| Unit | Leading surface | Focal length | Lens structure length | Front principal point position | Rear principal point position |
|---|---|---|---|---|---|
| 1 | 1 | 71.00 | 51.73 | 32.98 | 0.64 |
| 2 | 12 | −13.70 | 21.79 | 2.59 | −11.43 |
| 3 | 21 | −42.20 | 3.50 | −0.07 | −1.98 |
| 4 | 24 | 39.35 | 15.97 | 2.73 | −7.70 |
| 5 | 32 | 28.75 | 63.28 | 15.66 | −23.17 |

Single lens data

| Lens | Leading surface | Focal length |
|---|---|---|
| 1 | 1 | −150.30 |
| 2 | 3 | −217.12 |
| 3 | 4 | 116.99 |
| 4 | 6 | 289.24 |

-continued

Unit: mm

| | | |
|---|---|---|
| 5 | 8 | 194.25 |
| 6 | 10 | 162.62 |
| 7 | 12 | −19.52 |
| 8 | 14 | 20.66 |
| 9 | 15 | −13.27 |
| 10 | 17 | 25.08 |
| 11 | 19 | −36.41 |
| 12 | 21 | −23.52 |
| 13 | 22 | 53.74 |
| 14 | 25 | 48.30 |
| 15 | 27 | 185.71 |
| 16 | 29 | 46.35 |
| 17 | 30 | −42.80 |
| 18 | 32 | −35.16 |
| 19 | 34 | 34.60 |
| 20 | 35 | −112.32 |
| 21 | 37 | 44.40 |
| 22 | 39 | 70.12 |
| 23 | 41 | −248.25 |
| 24 | 43 | 0.00 |
| 25 | 44 | 0.00 |

Numerical Embodiment 4

Unit: mm

Surface data

| Surface Number | r | d | nd | vd | Effective diameter |
|---|---|---|---|---|---|
| 1 | −248.450 | 2.30 | 1.74950 | 35.3 | 81.91 |
| 2 | 209.479 | 5.49 | | | 80.59 |
| 3 | 391.268 | 2.30 | 1.80518 | 25.4 | 80.78 |
| 4 | 121.284 | 13.79 | 1.60300 | 65.4 | 80.34 |
| 5 | −162.815 | 7.48 | | | 80.37 |
| 6 | 127.510 | 7.34 | 1.43875 | 94.9 | 77.06 |
| 7 | −55946.739 | 0.15 | | | 76.52 |
| 8 | 106.101 | 6.89 | 1.61800 | 63.3 | 72.74 |
| 9 | 865.964 | 0.15 | | | 71.97 |
| 10 | 69.050 | 5.83 | 1.72916 | 54.7 | 64.32 |
| 11 | 158.452 | (Variable) | | | 63.23 |
| 12* | 228.519 | 0.70 | 1.88300 | 40.8 | 28.55 |
| 13 | 16.094 | 5.93 | | | 23.06 |
| 14 | −123.223 | 6.59 | 1.80518 | 25.4 | 22.82 |
| 15 | −15.129 | 0.70 | 1.75500 | 52.3 | 22.46 |
| 16 | 30.692 | 0.68 | | | 20.59 |
| 17 | 23.413 | 5.61 | 1.60342 | 38.0 | 20.71 |
| 18 | −39.635 | 0.88 | | | 20.13 |
| 19 | −24.853 | 0.70 | 1.83481 | 42.7 | 20.08 |
| 20 | −134.691 | (Variable) | | | 20.05 |
| 21 | −28.312 | 0.70 | 1.74320 | 49.3 | 21.02 |
| 22 | 46.740 | 2.80 | 1.84666 | 23.8 | 23.02 |
| 23 | −2634.956 | (Variable) | | | 23.58 |
| 24 (Stop) | ∞ | 1.30 | | | 20.68 |
| 25 | 360.024 | 4.38 | 1.65844 | 50.9 | 28.54 |
| 26 | −34.891 | 0.15 | | | 28.95 |
| 27 | 93.089 | 2.20 | 1.51633 | 64.1 | 29.52 |
| 28 | −3728.151 | 0.15 | | | 29.49 |
| 29 | 89.504 | 6.00 | 1.51633 | 64.1 | 29.43 |
| 30 | −32.080 | 1.80 | 1.83400 | 37.2 | 29.25 |
| 31 | −210.910 | 35.20 | | | 29.56 |
| 32 | 238.279 | 2.00 | 1.77250 | 49.6 | 22.36 |
| 33 | 50.037 | 1.36 | | | 22.24 |
| 34 | 154.277 | 6.72 | 1.49700 | 81.5 | 22.38 |
| 35 | −21.299 | 4.12 | 1.90366 | 31.3 | 22.80 |
| 36 | −42.643 | 0.97 | | | 24.87 |
| 37 | 45.808 | 5.51 | 1.48749 | 70.2 | 25.61 |
| 38 | −47.815 | 0.50 | | | 25.57 |
| 39 | 39.721 | 4.64 | 1.57099 | 50.8 | 24.50 |
| 40 | −43.338 | 1.99 | 1.88300 | 40.8 | 24.10 |
| 41 | −167.436 | 8.00 | | | 23.37 |
| 42 | ∞ | 21.00 | 1.70154 | 41.2 | 40.00 |
| 43 | ∞ | 6.75 | 1.51680 | 64.2 | 40.00 |
| 44 | ∞ | 5.77 | | | 40.00 |
| Image plane | ∞ | | | | |

Aspherical surface data
Twelfth surface

K = 8.58860e+000   A4 = 7.05382e−006   A6 = −1.80303e−008
A8 = 7.49637e−011   A10 = −8.01854e−013   A12 = 5.80206e−015
A3 = −4.50041e−007   A5 = 1.66019e−008   A7 = −8.87373e−010
A9 = 1.99340e−011   A11 = −1.17115e−013

Various data
Zoom ratio 20.00

| Focal length | 5.10 | 10.20 | 20.71 | 68.00 | 102.00 |
|---|---|---|---|---|---|
| F number | 1.45 | 1.45 | 1.45 | 1.45 | 1.66 |
| Half angle of field | 30.47 | 16.39 | 8.24 | 2.53 | 1.68 |
| Image height | 3.00 | 3.00 | 3.00 | 3.00 | 3.00 |
| Total lens length | 258.00 | 258.00 | 258.00 | 258.00 | 258.00 |
| BF (in air) | 5.77 | 5.77 | 5.77 | 5.77 | 5.77 |
| d11 | 0.85 | 22.26 | 36.83 | 50.73 | 53.23 |
| d20 | 55.23 | 30.79 | 13.88 | 3.50 | 5.98 |
| d23 | 4.40 | 7.43 | 9.77 | 6.25 | 1.28 |
| Entrance pupil position | 50.91 | 101.86 | 186.83 | 470.38 | 622.45 |
| Exit pupil position | 40.46 | 40.46 | 40.46 | 40.46 | 40.46 |
| Front principal point position | 56.76 | 115.05 | 219.90 | 671.69 | 1024.37 |
| Rear principal point position | 0.67 | −4.43 | −14.93 | −62.23 | −96.23 |

Zoom lens unit data

| Unit | Leading surface | Focal length | Lens structure length | Front principal point position | Rear principal point position |
|---|---|---|---|---|---|
| 1 | 1 | 71.00 | 51.73 | 32.98 | 0.64 |
| 2 | 12 | −13.70 | 21.79 | 2.59 | −11.43 |
| 3 | 21 | −42.20 | 3.50 | −0.07 | −1.98 |
| 4 | 24 | 37.31 | 15.97 | 3.06 | −7.42 |
| 5 | 32 | 31.87 | 63.56 | 15.31 | −25.96 |

Single lens data

| Lens | Leading surface | Focal length |
|---|---|---|
| 1 | 1 | −150.30 |
| 2 | 3 | −217.12 |
| 3 | 4 | 116.99 |
| 4 | 6 | 289.24 |
| 5 | 8 | 194.25 |
| 6 | 10 | 162.62 |
| 7 | 12 | −19.52 |
| 8 | 14 | 20.66 |
| 9 | 15 | −13.27 |
| 10 | 17 | 25.08 |
| 11 | 19 | −36.41 |
| 12 | 21 | −23.52 |
| 13 | 22 | 53.74 |
| 14 | 25 | 48.30 |
| 15 | 27 | 175.28 |
| 16 | 29 | 46.35 |
| 17 | 30 | −45.29 |
| 18 | 32 | −81.98 |
| 19 | 34 | 38.03 |
| 20 | 35 | −51.48 |
| 21 | 37 | 48.77 |
| 22 | 39 | 36.88 |
| 23 | 40 | −66.34 |
| 24 | 42 | 0.00 |
| 25 | 43 | 0.00 |

TABLE 1

|  | Numerical Embodiment 1 | Numerical Embodiment 2 | Numerical Embodiment 3 | Numerical Embodiment 4 |
|---|---|---|---|---|
| Conditional Expression (1) | −5.47 | −2.86 | −1.22 | −2.57 |
| Conditional Expression (2) | −2.98 | −4.10 | −8.64 | −2.08 |
| Conditional Expression (3) | −2.37 | −2.15 | −3.54 | −1.80 |
| Conditional Expression (4) | 2.90 | 2.39 | 2.31 | 2.39 |
| Conditional Expression (5) | 1.19 | 1.34 | 1.37 | 1.17 |
| BF (in air) | 26.49 | 26.50 | 28.38 | 30.57 |
| Exit pupil position | 65.04 | 32.60 | 41.50 | 40.46 |
| Conditional Expression (6) | 0.596 | 0.791 | 0.647 | 0.943 |

Numerical Embodiment 1 satisfies any of the conditional expressions. Therefore, a back focus corresponding to a necessary length is ensured. In addition, the exit pupil position is 65.04 mm, and hence the exit pupil is located at a sufficient distance.

Numerical Embodiment 2 satisfies any of the conditional expressions. Therefore, a back focus corresponding to a necessary length is ensured. In addition, the exit pupil position is 32.60 mm, and hence the exit pupil is located at a sufficient distance.

Numerical Embodiment 3 satisfies any of the conditional expressions. Therefore, a back focus corresponding to a necessary length is ensured. In addition, the exit pupil position is 41.50 mm, and hence the exit pupil is located at a sufficient distance.

Numerical Embodiment 4 satisfies any of the conditional expressions. Therefore, a back focus corresponding to a necessary length is ensured. In addition, the exit pupil position is 40.46 mm, and hence the exit pupil is located at a sufficient distance.

FIG. 9 is a schematic diagram of a principal part of an image pickup apparatus (television camera system) using the zoom lens according to each of the embodiments as an image pickup optical system. In FIG. 9, a zoom lens 101 according to any one of the first to fourth embodiments and a camera 124 are provided. The zoom lens 101 is detachably attached to the camera 124. An image pickup apparatus 125 has a structure in which the zoom lens 101 is attached to the camera 124. The zoom lens 101 includes a first lens unit F, a magnification-varying portion (magnification-varying lens unit) LZ and a fourth lens unit R for imaging. The first lens unit F includes a focusing lens unit. The magnification-varying portion LZ includes a second lens unit V which moves on the optical axis for magnification-varying and a third lens unit C which moves on the optical axis so as to correct image plane variation due to magnification-varying.

The first lens unit F and the magnification-varying portion LZ serve as the front lens group. The fourth lens unit R serves as the rear lens group.

The zoom lens 101 includes the aperture stop SP. The fourth lens unit R includes a lens unit IE which may be inserted onto or removed from the optical path between a front lens group 4F and a rear lens group 4B. The lens unit IE is provided to shift the focal length range of the entire zoom lens 101. Drive mechanisms 114 and 115 such as helicoids or cams drive the first lens unit F and the magnification-varying portion LZ, respectively, in the optical axis direction. Motors (drive units) 116 to 118 are provided to electrically drive the drive mechanisms 114 and 115 and the aperture stop SP. Detectors 119 to 121 such as encoders, potentiometers or photosensors detect positions of the first lens unit F and the magnification-varying portion LZ on the optical axis and a stop diameter of the aperture stop SP. The camera 124 includes a glass block 109 corresponding to an optical filter or a color separation prism, and a solid-state image pickup element (photoelectric transducer) 110 such as a CCD sensor or a CMOS sensor, for receiving a subject image formed by the zoom lens 101. CPUs 111 and 122 perform various drive controls of the camera 124 and the main body of the zoom lens 101, respectively. When the zoom lens according to the present invention is applied to the television camera system as described above, the image pickup apparatus having high optical performance is realized.

According to each of the embodiments, the zoom lens is obtained in which the back focus is long, the exit pupil is located far away from the image plane, white-shading is less likely to occur, and the high-quality image is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-120561, filed May 26, 2010, which is hereby incorporated by reference herein in its entirety.

What is claimed is:

1. A zoom lens, comprising, in order from an object side to an image side:
   a front lens group including a lens unit which is moved during zooming;
   an aperture stop; and
   a rear lens group having a positive refractive power, which is not moved for zooming,
   wherein the rear lens group includes:
      a front lens unit having a positive refractive power, which is located on the object side of a maximum air interval in the rear lens group; and
      a rear lens unit having a positive refractive power, which is located on the image side of the maximum air interval in the rear lens group, the maximum air interval in the rear lens group being interposed between the front lens unit and the rear lens unit,
   wherein the rear lens unit includes:
      a first lens (s1) having a negative refractive power, which is located on the most object side;
      a second lens (s3) having a negative refractive power, which is located on the most image side, and
   wherein the following conditional expressions are satisfied:

$$-6.0 \leq fs1/frr \leq -1.0; \text{ and}$$

$$-9.0 \leq fs3/frr \leq -2.0,$$

where frr indicates a focal length of the rear lens unit, and fs1 and fs3 indicate a focal length of the first lens (s1) and a focal length of the second lens (s3), respectively.

2. A zoom lens according to claim 1,
   wherein the rear lens unit further includes a third lens (s2) having a positive refractive power, which is located adjacent to the second lens (s3), and
   wherein the following conditional expression is satisfied:

$$-4.0 \leq fs3/fs2 \leq -1.5,$$

where fs2 indicates a focal length of the third lens (s2).

3. A zoom lens according to claim 1, wherein the following conditional expression is satisfied:

$$2.0 \leq DLR/drr \leq 3.0,$$

where DLR indicates a total length of the rear lens group and drr indicates a total length of the rear lens unit.

4. A zoom lens according to claim 1, wherein the following conditional expression is satisfied:

$$1.0 \leq frf/frr \leq 1.4,$$

where frf indicates a focal length of the front lens unit.

5. A zoom lens according to claim 1, wherein the front lens group includes, in order from the object side to the image side:
 a first lens unit having a positive refractive power, which is not moved for zooming;
 a second lens unit having a negative refractive power, which is moved during zooming; and
 a third lens unit having a negative refractive power, which is moved during zooming.

6. A zoom lens according to claim 5, wherein the first lens unit includes, in order from the object side to the image side:
 a first lens subunit which is not moved for focusing; and
 a second lens subunit having a positive refractive power, which is moved to the object side during focusing from an infinite distance object to a close distance object.

7. A zoom lens according to claim 1,
 wherein the front lens unit includes, in order from the object side to the image side, a positive lens, a positive lens, and a cemented lens obtained by cementing a positive lens and a negative lens, and
 wherein the rear lens unit includes, in order from the object side to the image side, the first lens (s1) having a negative refractive power, a cemented lens obtained by cementing a positive lens and a negative lens, a positive lens, a third lens (s2) having a positive refractive power, and the second lens (s3) having a negative refractive power.

8. A zoom lens according to claim 1, wherein the following conditional expression is satisfied:

$$0.45 \leq ds/frf \leq 1.10,$$

where ds indicates an interval between the front lens unit and the rear lens unit, and frf indicates a focal length of the front lens unit.

9. An image pickup apparatus, comprising:
 the zoom lens according to claim 1; and
 a solid-state image pickup element for receiving an image formed by the zoom lens.

* * * * *